United States Patent
Mendu et al.

(10) Patent No.: US 10,958,550 B2
(45) Date of Patent: Mar. 23, 2021

(54) DISRUPTIONLESS MESSAGE CAPTURING WITHIN AN INDUSTRIAL CONTROL SYSTEM

(71) Applicant: Schneider Electric Systems USA, Inc., Foxboro, MA (US)

(72) Inventors: Krishna Rao Mendu, Canton, MA (US); Christopher Hu, Foxboro, MA (US); Naveen Kumar, Foxboro, MA (US); Richard Linwood Linscott, Plainville, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 44 days.

(21) Appl. No.: 16/424,642

(22) Filed: May 29, 2019

(65) Prior Publication Data
US 2019/0372915 A1  Dec. 5, 2019

Related U.S. Application Data

(60) Provisional application No. 62/677,414, filed on May 29, 2018.

(51) Int. Cl.
*H04L 12/26* (2006.01)
*H04L 12/24* (2006.01)

(52) U.S. Cl.
CPC ...... *H04L 43/0823* (2013.01); *H04L 43/0847* (2013.01); *H04L 41/06* (2013.01)

(58) Field of Classification Search
CPC .. H04L 43/0823; H04L 43/0847; H04L 41/06
See application file for complete search history.

(56) References Cited

U.S. PATENT DOCUMENTS

| | | | |
|---|---|---|---|
| 5,555,190 A | 9/1996 | Derby et al. | |
| 7,848,827 B2* | 12/2010 | Chen | G05B 19/4185 700/19 |
| 2002/0183951 A1 | 12/2002 | Cunningham et al. | |
| 2005/0225441 A1* | 10/2005 | Kernan | H04L 12/66 340/506 |
| 2006/0143493 A1* | 6/2006 | Meis | H04L 41/06 714/47.1 |
| 2008/0080543 A1 | 4/2008 | Hickox et al. | |
| 2010/0082805 A1 | 4/2010 | Orton et al. | |

(Continued)

FOREIGN PATENT DOCUMENTS

EP   3316052 A1   5/2018

OTHER PUBLICATIONS

Extended European Search Report dated Oct. 10, 2019 relating to European Application No. 19177005.6, 9 pages.

*Primary Examiner* — Min Jung
(74) *Attorney, Agent, or Firm* — Stinson LLP

(57) ABSTRACT

Capturing messages exchanged with field devices in an industrial process without disrupting communication of the messages. A diagnostic driver embedded within a gateway device detects abnormal conditions in connections between the gateway device and the field devices. The diagnostic driver captures messages indicative of the abnormal condition without disrupting message communication. The driver is capable of transmitting captured messages, on demand, to a workstation computing device for diagnosis of the abnormal condition.

20 Claims, 6 Drawing Sheets

(56) References Cited

U.S. PATENT DOCUMENTS

| | | | |
|---|---|---|---|
| 2014/0269744 A1* | 9/2014 | Flanders | G06F 11/20 370/401 |
| 2016/0041539 A1* | 2/2016 | Kemp | G05B 15/02 700/80 |
| 2016/0188322 A1* | 6/2016 | De Groot | G05B 19/0426 717/169 |
| 2018/0164778 A1* | 6/2018 | Gunzert | G05B 19/4185 |

* cited by examiner

DISRUPTIONLESS MESSAGE CAPTURING WITHIN AN INDUSTRIAL CONTROL SYSTEM

CROSS REFERENCE TO RELATED APPLICATION

This application claims the benefit of U.S. Provisional Patent Application No. 62/677,414, filed May 29, 2018, the contents of which are incorporated by reference in their entirety for all purposes.

TECHNICAL FIELD

Aspects of the present disclosure generally relate of the fields of networked computerized industrial control automation systems. More particularly, aspects of the present disclosure relate to a diagnostic driver that captures electronic data messages exchanged with field devices of the industrial control automation system without disrupting device communications.

BACKGROUND

Industrial control and automation systems generally comprise process controller devices, which are typically connected via networks to large quantities of field devices throughout a process control system. Field devices in a process come in a variety of types and functionalities and may be created by many different vendor companies. Controlling the huge variety of field devices in concert is a vital task for ensuring the productivity and effective operations of process control systems.

Typical industrial processes today are extremely complex and involve many intelligent devices such as transmitters, positioners, motor drives, limit switches, and other communication enabled devices. By way of example, it is not unheard of to have thousands of sensors and control elements (e.g., valve actuators) monitoring/controlling aspects of a multi-stage process within an industrial plant. As field devices have become more advanced over time, the process of controlling and synchronizing the field devices has also increased in complexity.

For instance, transmitters and positioners in previous generations of industrial process control equipment were comparatively simple components. Before the introduction of digital (intelligent) transmitters, activities associated with a field device were relatively simple. Industry standards like 3-15 psi for pneumatic instruments or 4-20 ma for electronic instruments allowed a degree of interoperability that minimized setup, configuration, and operation of analog transmitters. More contemporary field devices, however, include digital data transmitting capabilities and on-device digital processors. These modern devices, referred to generally as "intelligent" field devices, require significantly more configuration effort when setting up a new field device. Management of complex, intelligent devices requires a variety of different software interfaces, protocols, and drivers to ensure efficient interaction with each type of device.

Gateway devices provide control and input/output (I/O) interfaces between field devices and process automation systems. Unfortunately, conventional techniques for diagnosing or debugging interfacing issues between field devices and gateway devices are cumbersome procedures. For example, debugging interface issues for serial ports requires disconnecting the device interface and connecting a special hardware snooper. And debugging interface issues for Ethernet ports requires configuring a mirror port on a network switch that interfaces the gateway, connecting a station on that port, and running a packet capture tool on the station to capture messages exchanged between the gateway and the field devices. Disadvantageously, these conventional techniques require disrupting communications with the devices and/or adding extra hardware in the communication path to the devices.

SUMMARY

Aspects of the disclosure utilize a diagnostic driver embedded within a gateway device that captures messages exchanged with field devices through the gateway device within an industrial control automation system without disrupting device communications or requiring the addition of extra hardware. Beneficially, messages captured in this disruptionless manner can be transmitted to a workstation computing device on-demand for diagnosing device interface issues within the industrial control automation system. According to aspects of the disclosure, there is no need for physical disconnection or adding of special hardware for serial interfaces or for setting up a mirrored port on switches.

A system for disruptionless message capturing within an industrial control system embodying aspects of the disclosure includes a device integrator processor, a memory device, a diagnostic driver, serial interfaces, and an Ethernet interface. The serial interfaces are configured to communicatively couple the device integrator processor to serial field devices for use in an industrial process of a process control system. The communicative coupling supports communication of electronic data messages with the serial field devices in accordance with a serial electronic data communication protocol. The Ethernet interface is configured to communicatively couple the diagnostic driver to a computing device in accordance with an Ethernet electronic data communication protocol. The diagnostic driver comprises processor-executable instructions stored on the memory device. When executed by the device integrator processor, the instructions configure the diagnostic driver to capture electronic data messages exchanged with the serial field devices using a serial communication protocol via the serial interfaces without disrupting the communication of the messages. The executing instructions further configure the diagnostic driver to transmit the captured electronic data messages to the computing device via the Ethernet interfaces using a proprietary communication protocol. The captured messages are indicative of an abnormal condition in the communicative coupling of the device integrator processor and the serial field devices via the serial interfaces.

Another system for disruptionless message capturing within an industrial control system embodying aspects of the disclosure includes a device integrator processor, a memory device, a diagnostic driver, and an Ethernet interface. The Ethernet interface is configured to communicatively couple the device integrator processor to Ethernet field devices for use in an industrial process of a process control system. The communicative coupling supports communication of electronic data messages with the Ethernet field devices in accordance with one or more Ethernet electronic data communication protocols. The Ethernet interface is further configured to communicatively couple the diagnostic driver to a diagnostic computing device in accordance with an Ethernet electronic data communication protocol. The diagnostic driver comprises processor-executable instructions stored on the memory device. When executed by the device integrator processor, the instructions configure the diagnostic driver to capture electronic data messages exchanged with the Ethernet field devices via the Ethernet interface using one or more Ethernet communication protocols without disrupting communication of the messages. The captured electronic data messages are indicative of an abnormal condition in the communicative coupling of the device integrator processor and the Ethernet field devices via the Ethernet interface.

In an aspect, a computer-readable medium stores processor-executable instructions that, when executed, configure a device integrator processor of a gateway device for disruptionless message capturing within an industrial control system. The instructions comprise coupling the device integrator processor of the gateway device to serial field devices in a process control system. The coupling to the serial field devices is achieved via serial interfaces of the gateway device and supports communication of serial electronic data messages with the serial field devices in accordance with at least one serial electronic data communication protocol. The instructions further include coupling the device integrator processor to Ethernet field devices in the process control system via Ethernet interfaces of the gateway device. The coupling to the Ethernet field devices supports communication of Ethernet electronic data messages with the Ethernet field devices in accordance with an Ethernet data communication protocol. The processor-executable instructions include coupling a diagnostic driver of the gateway device to a workstation computing device via the Ethernet interfaces, which supports communication of diagnostic Ethernet electronic data packets between the diagnostic driver and the workstation computing device. The instructions further include initializing the diagnostic driver within the gateway device. The diagnostic driver captures one or more of the serial electronic data messages communicated with the serial field devices via the serial interfaces without disrupting the communication of the serial electronic data messages. The diagnostic driver also captures one or more of the Ethernet electronic data messages communicated with the Ethernet field devices via the Ethernet interfaces without disrupting communication of the Ethernet electronic data messages. The captured serial electronic data messages are indicative of an abnormal condition in the coupling of the device integrator processor to the serial field devices via the serial interfaces and the captured Ethernet electronic data messages are indicative of an abnormal condition in the coupling of the device integrator processor to the Ethernet field devices via the Ethernet interfaces.

A method of process control communication resilience embodying aspects of the present disclosure comprises receiving a Configurable Multi-protocol Data Stream (CMDS) at a controller from one or more connected devices, processing the received CMDS for one or more process error event codes, processing a communication correlation error based on the one or more process event error codes, and executing a communication resilience process at the controller utilizing the one or more connected devices based on the communication correlation error. Additional embodiments may further comprise a plurality of controllers. Furthermore, the one or more process error event codes may be at least one of an error frame, an application error, and/or a device error condition. Principles of the disclosure may further comprise at least one or more process control changes from the one or more connected devices. Additionally, the one or more process control changes may be at least one of a process change, a device state change, and/or an environmental change.

In another aspect, a system for disruptionless message capturing within an industrial control system includes a device integrator processor, a memory device, a diagnostic driver, serial interfaces, and a mesh network interface. The serial interfaces are configured to communicatively couple the device integrator processor to serial field devices for use in an industrial process of a process control system. The communicative coupling supports communication of electronic data messages with the serial field devices in accordance with a serial electronic data communication protocol. The mesh network interface is configured to communicatively couple the diagnostic driver to a computing device in accordance with a mesh network electronic data communication protocol. The diagnostic driver comprises processor-executable instructions stored on the memory device. When executed by the device integrator processor, the instructions configure the diagnostic driver to capture electronic data messages exchanged with the serial field devices using a serial communication protocol via the serial interfaces without disrupting the communication of the messages. The executing instructions further configure the diagnostic driver to transmit the captured electronic data messages to the computing device via the mesh network interface using a proprietary communication protocol. The captured messages are indicative of an abnormal condition in the communicative coupling of the device integrator processor and the serial field devices via the serial interfaces.

In yet another aspect, a computer-readable medium stores processor-executable instructions that, when executed, configure a device integrator processor of a gateway device for disruptionless message capturing within an industrial control system. The instructions comprise coupling the device integrator processor of the gateway device to serial field devices in a process control system. The coupling to the serial field devices is achieved via serial interfaces of the gateway device and supports communication of serial electronic data messages with the serial field devices in accordance with at least one serial electronic data communication protocol. The instructions further include coupling the device integrator processor to mesh network field devices in the process control system via mesh network interfaces of the gateway device. The coupling to the mesh network field devices supports communication of mesh network electronic data messages with the mesh network field devices in accordance with an mesh network data communication protocol. The processor-executable instructions include coupling a diagnostic driver of the gateway device to a workstation computing device via the mesh network interfaces, which supports communication of diagnostic mesh network electronic data packets between the diagnostic driver and the workstation computing device. The instructions further include initializing the diagnostic driver within the gateway device. The diagnostic driver captures one or more of the serial electronic data messages communicated with the serial field devices via the serial interfaces without disrupting the communication of the serial electronic data messages. The diagnostic driver also captures one or more of the mesh network electronic data messages communicated with the mesh network field devices via the mesh network interfaces without disrupting communication of the mesh network electronic data messages. The captured serial electronic data messages are indicative of an abnormal condition in the coupling of the device integrator processor to the serial field devices via the serial interfaces and the captured mesh network electronic data messages are indicative of an abnormal condition in the coupling of the device integrator processor to the mesh network field devices via the mesh network interfaces.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Gateway devices provide control and input/output (I/O) interfaces between field devices and process automation systems. Unfortunately, conventional techniques for diagnosing or debugging interfacing issues between field devices and gateway devices are cumbersome procedures. For example, debugging interface issues for serial ports requires disconnecting the device interface and connecting a special hardware snooper. And debugging interface issues for Ethernet ports requires configuring a mirror port on a network switch that interfaces the gateway, connecting a station on that port, and running a packet capture tool on the station to capture messages exchanged between the gateway and the field devices. Disadvantageously, these conventional techniques require disrupting communications with the devices and/or adding extra hardware in the communication path to the devices.

Figure 1:
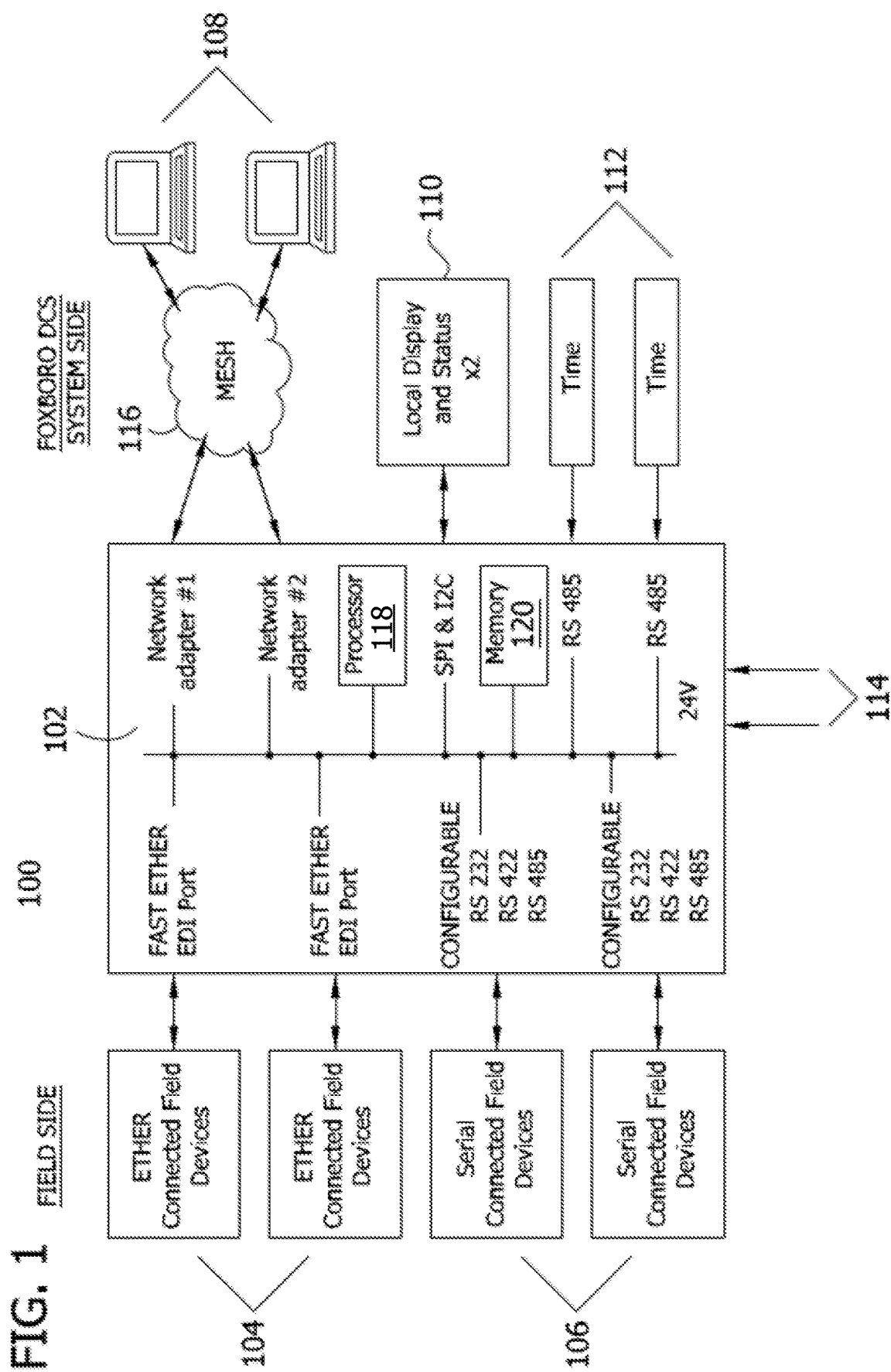
FIG. 1 is a block diagram of an exemplary process control system employing a gateway device according to an embodiment of the disclosure.

Referring to FIG. 1, a process control system 100 embodying aspects of the disclosure comprises a gateway device 102, Ethernet field devices 104, serial field devices 106, workstations and controllers 108, interface devices 110, clock signals 112, and a power source 114. The gateway device 102 includes a device integrator processor 118, a memory storage device 120, and a plurality of input/output data interfaces configured to support electronic data communications with field devices as described herein. The gateway device 102 is communicatively and/or electrically coupled to the Ethernet field devices 104, the serial field devices 106, the workstations and controllers 108, the interface devices 110, the clock signals 112, and the power source 114. Aspects of process control system 100, including gateway device 102, are further described herein and in U.S. patent application Ser. No. 15/794,746, filed Oct. 26, 2017, entitled MULTI-PROTOCOL GATEWAY WITH CONTROL IN A PROCESS CONTROL SYSTEM and in U.S. patent application Ser. No. 14/872,590, filed Oct. 1, 2015, entitled MULTI-CORE DEVICE WITH SEPARATE REDUNDANCY SCHEMES IN A PROCESS CONTROL SYSTEM, the entire disclosures of which are expressly incorporated herein by reference, including the contents and teachings of any references contained therein. In one or more embodiments, the gateway device 102 may be referred to as an embedded external device integrator (eEDI) device.

FIG. 1 shows the gateway device 102 configured for communication with other devices in the process control system 100. In an embodiment, the communications between the gateway device 102 and other devices of process control system 100 comprise requests and commands from the gateway device 102 to the other devices and responses and other data from the other devices to the gateway device 102. In another embodiment, the communications between the gateway device 102 and other devices of process control system 100 comprise one or more publication-subscription ("pub-sub") protocols (e.g., Object Linking and Embedding (OLE) for Process Control (OPC) protocol, etc.) in which gateway device 102 is notified when field inputs change. The gateway device 102 is connected to a power source 114 and a clock signal 112, which enables the gateway device 102 and modules therein to operate in synch. In an embodiment, the gateway device 102 connects to one or more interface devices 110, which are used to communicate information, such as status information, from the gateway device 102 to human operators, for example. The interface devices 110 communicate information from gateway device 102 to operators via one or more input/output devices, such as a visual display or other interface. In an embodiment, the gateway device 102 is referred to as a station and includes a diagnostic driver embodied in processor-executable instructions stored on memory storage device 120 and executed by device integrator processor 118 as further described herein.

The devices of process control system 100 connected to the gateway device 102 are configured to communicate through various types of interfaces. The workstations and controllers 108 are connected to the gateway device 102 through a mesh network 116, the Ethernet field devices 104 are connected to the gateway device 102 through Ethernet connections, and the serial field devices 106 are connected to the gateway device 102 through serial connections in the embodiment of FIG. 1. In an embodiment, the gateway device 102 communicates with serial field devices 106 using a Modbus protocol. In an embodiment, the gateway device 102 may connect to other types of devices and/or communicate with connected devices using other types of communication protocols as understood by a person of ordinary skill in the art. For example, each serial port of gateway device 102 can have a unique protocol.

Figure 2:
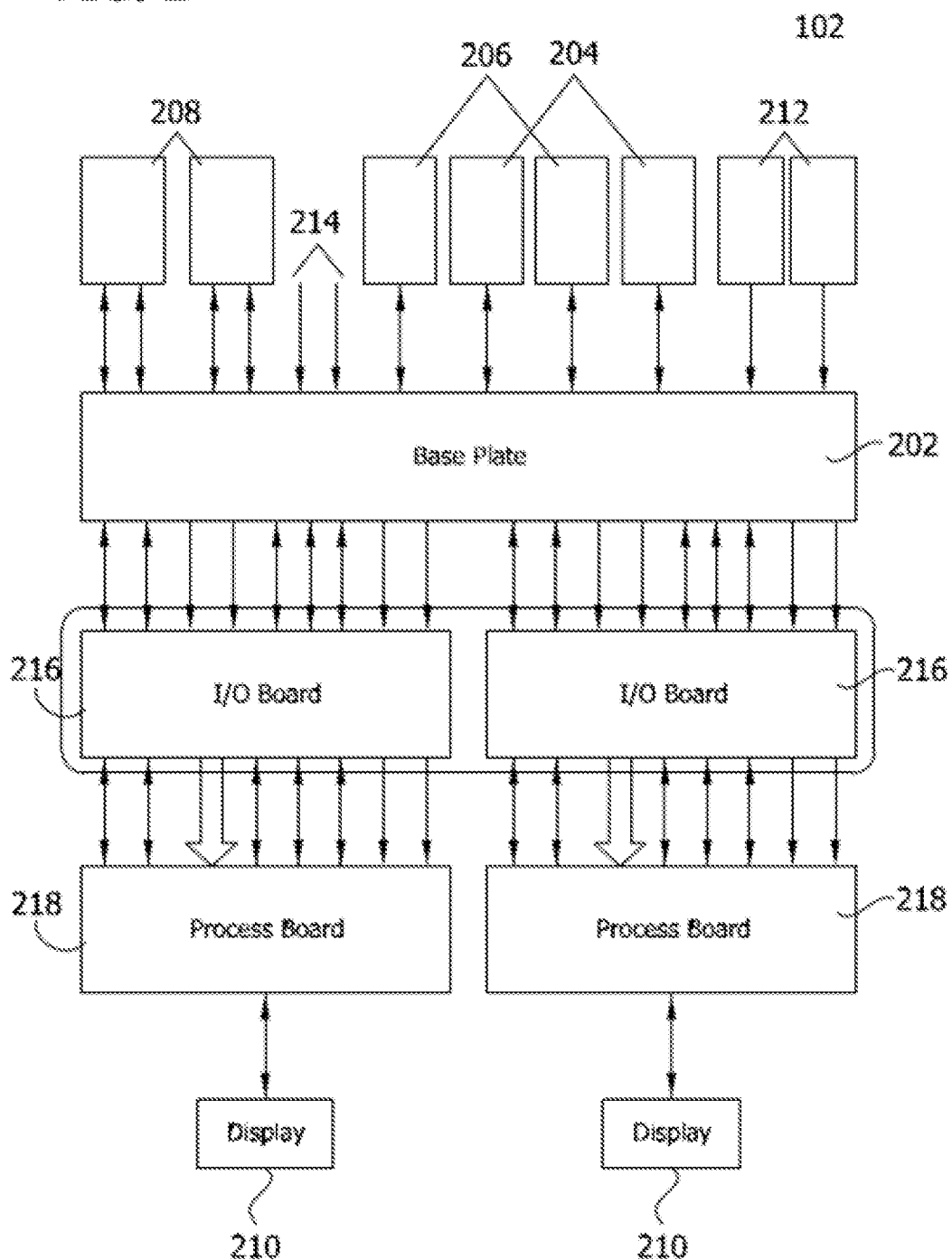
FIG. 2 is a diagram of exemplary hardware layers of the gateway device of FIG. 1.

Referring to FIG. 2, an embodiment the gateway device 102 comprises a plurality of hardware layers. The gateway device 102, in an embodiment, comprises one or more processor modules on a base plate 202, which connects the gateway device 102 to external connections. An exemplary module includes, but is not limited to, a Field Device Controller 280 (FDC 280) available from Schneider Electric, as further described herein, which can support multiple unique protocols running concurrently. One or more I/O boards 216 of the processor modules are directly attached (e.g., electrically coupled and/or physically coupled) to the base plate 202. The I/O boards 216 act as a conduit between the base plate 202 and processor boards 218. The processor boards 218 execute all of the processing tasks for the gateway device 102. In an embodiment, processor boards 218 correspond to processor 118. Displays 210 are connected (e.g., electrically and/or communicatively connected) to the processor boards 218 in order to monitor the activity of the gateway device 102. Through the base plate 202, the gateway device 102 interacts with (e.g., transmits data to and/or receives data from) mesh network 116 via mesh network interfaces 208, serial field devices 106 via serial interfaces 206, and Ethernet field devices 104 via Ethernet interfaces 204. The gateway device 102 is powered by the power source 114 connected via a power source interface 214 of the base plate 202, and processing tasks performed by the gateway device 102 are synchronized based on clock signals 112 received via clock signal interfaces 212. An embodiment of the I/O boards 216 provide low voltage power to the processor boards 218 by transforming higher voltage power from the base plate 202 to the desired voltage.

Figure 3:
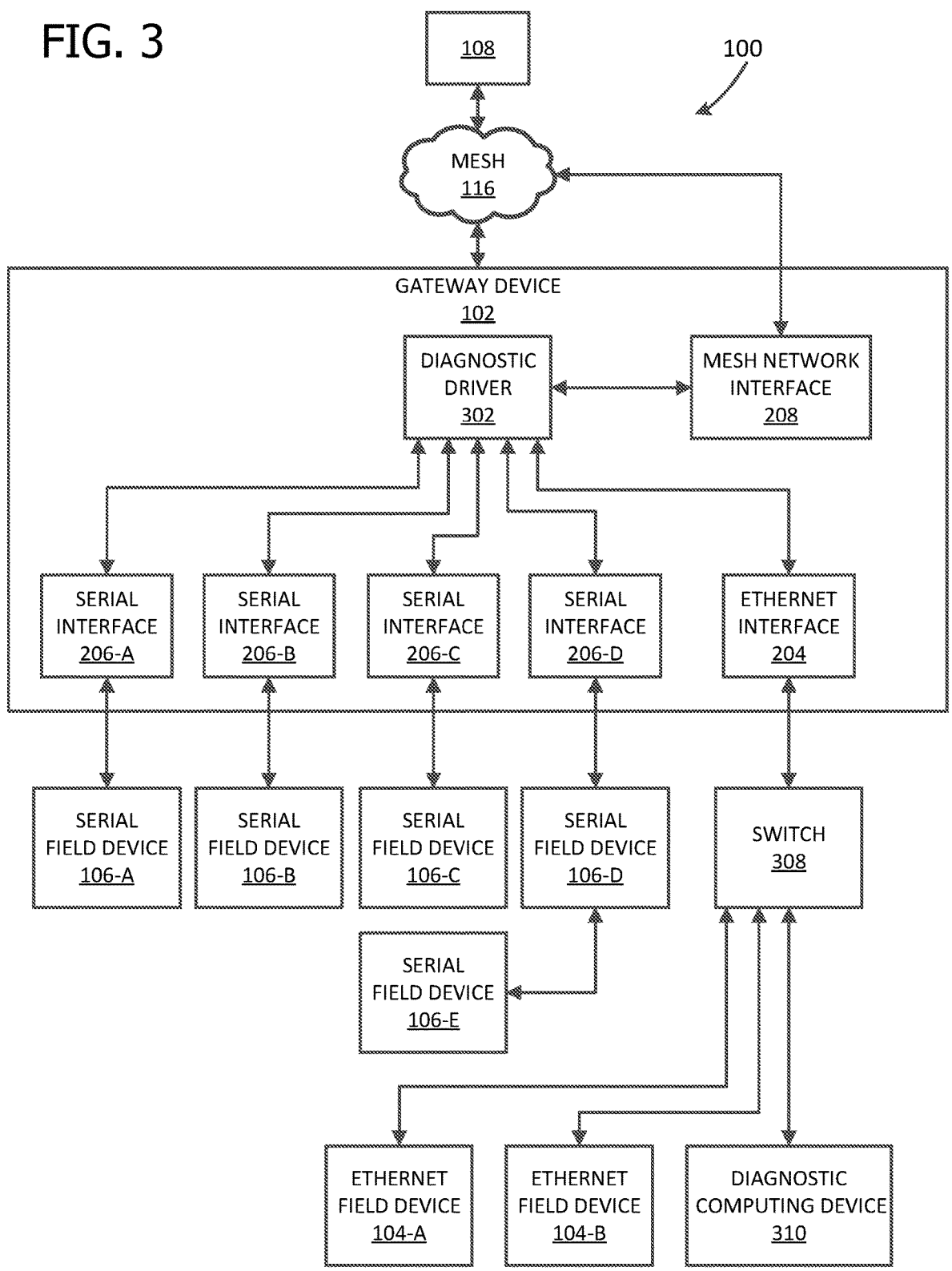
FIG. 3 is a block diagram illustrating the exemplary process control system of FIG. 1 employing a gateway device having an embedded diagnostic driver according to another embodiment.

FIG. 3 illustrates aspects of the process control system 100 from a slightly different perspective. In the embodiment of FIG. 3, the gateway device 102 includes a diagnostic driver 302. The gateway device 102 is communicatively and/or electrically coupled to serial field devices 106-A, 106-B, 106-C, and 106-D via the serial interfaces 206-A, 206-B, 206-C, and 206-D, respectively. Furthermore, the gateway device 102 is communicatively and/or electrically coupled to serial field device 106-E via serial interface 206-D and serial field device 106-D. Although the embodiment illustrated in FIG. 3 includes serial field device 106-D and serial field device 106-E coupled in a daisy chain configuration, one of ordinary skill in the art will understand that a plurality of serial field devices (e.g., serial field device 106-D and serial field device 106-E) may be communicatively and/or electrically coupled to serial interface 206-D in a multi-drop configuration. In such a multi-drop configuration, serial field device 106-E is communicatively and/or electrically coupled to serial interface 206-D directly (e.g., not via serial field device 106-D). For example, serial interface 206-D may be configured for communication with a plurality of field devices (e.g., up to 32, etc.) in accordance with the RS485 communication protocol. In some embodiments, serial interfaces 206-A, 206-B, 206-C and 206-D may be implemented as hardware, software, or both. In some embodiments, gateway device 102 may implement one or more master or slave protocols for at least one of serial interface 206-A, 206-B, 206-C, or 206-D to communicate with the respective field devices connected to the serial interfaces. 206-A, 206-B, 206-C and 206-D may operate in different modes, such as RS232, RS422, or RS485. The gateway device 102 is communicatively and/or electrically coupled to Ethernet field devices 104-A and 104-B and a diagnostic computing device 310 via the Ethernet interface 204 and a switch device 308. In some embodiments, gateway device 102 may implement one or more server or client protocols for at least one of serial interface 206-A, 206-B, 206-C, or 206-D to communicate with via Ethernet interface 204 with Ethernet field devices 104-A, 104-B, and 104-C. Gateway device 102 may implement multiple client and server protocols concurrently. The diagnostic computing device 310 may be connected to mesh network 116 in addition to or instead of the switch device 308. Moreover, gateway device 102 can be configured to send messages to diagnostic computing device 310 over Ethernet through the Ethernet interface 204 and/or over mesh 116 through mesh network interface(s) 208.

In an embodiment, the Ethernet interface 204 and serial interfaces 206 are referred to as I/O ports and the Ethernet devices 104 and serial devices 106 are referred to as I/O devices. Although the embodiment illustrated in FIG. 3 includes four serial interfaces 206 and one Ethernet interface 204, one of ordinary skill in the art will understand that varying combinations of one or more Ethernet interfaces 204 and one or more serial interfaces 206 are within the scope of the present disclosure.

The diagnostic driver 302 is configured to capture electronic data messages exchanged with any or all of the Ethernet field devices 104 and/or serial field devices 106 through gateway device 102 without disrupting communications with the devices (i.e., "disruptionless message capturing"). In an exemplary embodiment, diagnostic driver 302 captures messages exchanged with serial field devices 106 utilizing an RS232, RS422, and/or RS485 electronic data communication protocols without breaking existing connections and without utilizing additional special-purpose hardware. In another exemplary embodiment, diagnostic driver 302 captures messages exchanged with Ethernet field devices 104 utilizing an Ethernet electronic data communication protocol without utilizing a mirrored port on the switch device 308. In an aspect, diagnostic driver 302 comprises processor-executable instructions embodied on memory storage device 120 and executed by device integrator processor 118.

The diagnostic driver 302 is further configured to transmit captured electronic data messages to a computing device (e.g., workstations and controllers 108, diagnostic computing device 310, etc.). The diagnostic driver 302 transmits captured electronic data messages as a payload on one or more electronic data communications in accordance with a User Datagram Protocol (UDP). In an embodiment, diagnostic driver 302 transmits captured messages to diagnostic computing device 310 on demand (e.g., when configured and enabled, in contrast to permanently enabled or disabled, etc.) via Ethernet interface 204. In another embodiment, diagnostic driver 302 transmits captured messages to diagnostic computing device 310 in near real-time (e.g., in contrast to collected internally and then later analyzed) via Ethernet interface 204. For example, diagnostic driver 302 may be configured (e.g., by workstations and controllers 108, diagnostic computing device 310, etc.) with the destination IP address In accordance with an aspect of the disclosure, diagnostic driver 302 may be referred to as being "embedded" within gateway device 102.

The diagnostic driver 302 can be configured for one or more operation parameters (e.g., destination IP address, a list of field devices for which the messages need to be captured, duration of capture, etc.). For example, the diagnostic driver 302 may be configured by workstations and controllers 108, interface devices 110, diagnostic computing device 310, and the like. It is to be understood that in an embodiment the diagnostic computing device 310 may be a subcomponent of one of workstations and controllers 108.

In another embodiment, diagnostic driver 302 is configured to capture and transmit snapshots of a device interface health parameter of serial field devices 106 with serial interfaces 206 and/or Ethernet field devices 104 with Ethernet interface 204. Exemplary device interface health parameters include, but are not limited to, the number of cumulative communication timeouts, checksum errors, framing errors for selected devices, and the like.

The diagnostic computing device 310 is configured to receive messages from diagnostic driver 302, parse the received messages, filter the parsed messages, and store the filtered messages for easy viewing and analysis. The filtered and stored messages may be used to diagnose device interface issues between serial field devices 106 and serial interfaces 206 and/or Ethernet field devices 104 and Ethernet interface 204, for example.

Figure 4:
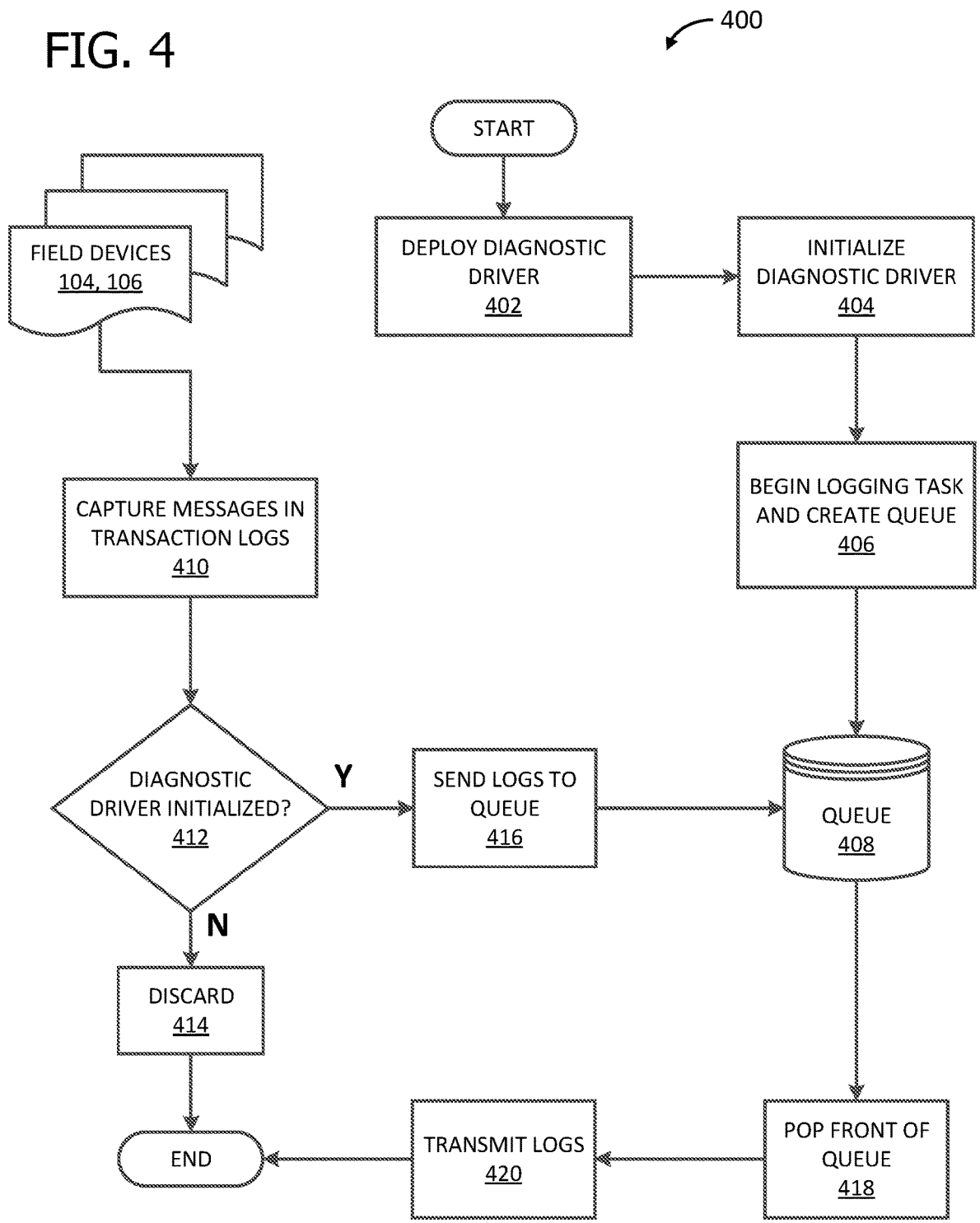
FIG. 4 is an exemplary flow diagram illustrating a message capture and transmission process of the diagnostic driver of FIG. 3.

FIG. 4 illustrates an exemplary message capture and transmission process, generally indicated at 400, performed by diagnostic driver 302. In an aspect, diagnostic driver 302 is similar to any other driver but creation of devices under diagnostic driver 302 is not allowed (e.g., no device is needed under diagnostic driver 302 for any reason). Selection of field devices 104, 106 whose messages are to be captured for diagnosis is accomplished via custom parameters of the driver, as further described herein.

At 402, the diagnostic driver 302 is deployed from workstations and controllers 108, for example. In other words, the configuration is downloaded from workstations and controllers 108 to gateway device 102. In an embodiment, the diagnostic driver 302 may be referred to as a log driver, such as an ECB200 driver for example. During deployment 402, an executing program in gateway device 102 creates diagnostic driver 302 under an Ethernet port (e.g., Ethernet interface 204) with a Driver ID (DRVRID) of "X". In an embodiment, the logging Driver ID is 3. Moreover, an IP address and port number of a computing device that will receive transmitted messages (e.g., logs) are specified in a custom parameter (e.g., CPARM1) of diagnostic driver 302.

Once diagnostic driver 302 is deployed it is set to an initialized state 404 (i.e., goes online). In an embodiment, diagnostic driver 302 is initialized in response to a specific user action, such as turning the driver online from a human-machine interface (HMI), for example. During initialization 404, diagnostic driver 302 starts 406, which creates a queue 408 within memory storage device 120. The queue 408 is a contiguous portion within memory storage device 120 that is permanently allocated during initialization 404. In an embodiment, queue 408 is a circular queue having a size of two megabytes (MB). No further dynamic memory allocation or de-allocation is performed at runtime, which results in no memory fragmentation. Furthermore, diagnostic driver 302 creates 406 a logging task during initialization 404.

Referring further to FIG. 4, diagnostic driver 302 captures the electronic data messages in transaction logs at 410. At 412, it is determined whether diagnostic driver 302 is initialized (i.e., online). In an embodiment, each task specific to processing communication to each device is the component that makes this determination. When the diagnostic driver 302 is not initialized, the captured messages are discarded at 414 (e.g., removed from memory storage device 120, etc.). When the diagnostic driver 302 is determined to be initialized at 412, the captured messages are sent at 416 to the queue 408. At 418, diagnostic driver 302 pops the first message from the front of queue 408 and transmits, at 420, the popped message to a receiver computing device (e.g., diagnostic computing device 310) via a User Datagram Protocol (UDP). In an embodiment, diagnostic driver 302 utilizes the custom parameters further described herein (e.g., IP address, port, etc.) to determine to which receiver computing device to transmit the popped messages. Additionally, messages may be popped from queue 408 to a buffer to temporarily store the messages (e.g., while the connection to the receiver computing device is experiencing congestion, etc.).

In an embodiment, diagnostic driver 302 is configured to save the last message exchanged on each of the I/O ports (e.g., Ethernet interface 204, serial interfaces 206, etc.) of gateway device 102. Additionally, diagnostic driver 302 is configured to transmit those last saved messages to a computing device (e.g., diagnostic computing device 310) via Ethernet interface 204 in response to a manual trigger received from an external application (e.g., executing on diagnostic computing device 310, workstations and controllers 108, etc.). This set of features may be utilized to diagnose intermittent communication issues with devices (e.g., Ethernet field devices 104, serial field devices 106, etc.) connected to gateway device 102, a sudden loss of communication with one or more of the devices, and/or one or more of the devices entering into an indeterminate state following the receipt of a message from gateway device 102, for example.

In another embodiment, diagnostic driver 302 is configured to accept a manual trigger from an external application (e.g., executing on diagnostic computing device 310, workstations and controllers 108, etc.) to begin message capturing 410. This capability may help troubleshoot issues related to messages exchanged with devices after an external event and/or a certain device state, for example. In yet another embodiment, diagnostic driver 302 is configured to begin message capturing 410 upon detecting an abnormal communication state. Exemplary abnormal communication states include, but are not limited to, partial reply messages, exception reply messages, and the like.

In an aspect, a system includes a device integrator processor (e.g., device integrator processor 118), a memory device (e.g., memory storage device 120), a diagnostic driver (e.g., diagnostic driver 302), serial interfaces (e.g., serial interfaces 206), and an Ethernet interface (e.g., Ethernet interface 204). The serial interfaces are configured to communicatively couple the device integrator processor to serial field devices (e.g., serial field devices 106) for use in an industrial process of a process control system (e.g., process control system 100). The communicative coupling supports communication of electronic data messages with the serial field devices in accordance with a serial electronic data communication protocol (e.g., RS232, RS422, RS485, etc.). The Ethernet interface is configured to communicatively couple the diagnostic driver to a computing device (e.g., workstations and controllers 108, diagnostic computing device 310, etc.) in accordance with an Ethernet electronic data communication protocol. The diagnostic driver comprises processor-executable instructions stored on the memory device. When executed by the device integrator processor, the instructions configure the diagnostic driver to capture (410) electronic data messages communicated with the serial field devices via the serial interfaces and the serial communication protocol without disrupting the communication of the messages. The executing instructions further configure the diagnostic driver to transmit (420) each captured electronic data message to the computing device via the Ethernet interface. The captured messages are indicative of an abnormal condition in the communicative coupling of the device integrator processor and the serial field devices via the serial interfaces. An abnormal condition may be the result of, for example, a cyberattack.

In one form, the transmission of the captured electronic data messages is on demand.

In another form, the diagnostic driver further comprises processor-executable instructions stored on the memory device that, when executed by the device integrator processor, create (406) a circular queue (e.g., queue 408) within the memory device for initializing (404) the diagnostic driver and create (406) a dedicated task for capturing the electronic data messages.

In yet another form, the processor-executable instructions, when executed by the device integrator processor, further configure the diagnostic driver to store (416) the captured electronic data messages in the queue and transmit a captured message to the computing device by popping the captured electronic data message from a front of the queue and including the popped electronic data message within a User Datagram Protocol packet.

In another form, the Ethernet interface is further configured to communicatively couple the device integrator processor to Ethernet field devices (e.g., Ethernet field devices 104) for supporting communication of electronic data messages with the Ethernet field devices in accordance with the Ethernet electronic data communication protocol. Moreover, the processor-executable instructions, when executed by the device integrator processor, further configure the diagnostic driver to capture (410) the electronic data messages communicated with the Ethernet field devices via the Ethernet interface and the Ethernet electronic data communication protocol without disrupting communication of the messages. Furthermore, the captured electronic data messages are indicative of an abnormal condition in the communicative coupling of the device integrator processor and the Ethernet field devices via the Ethernet interface.

In yet another form, the processor-executable instructions, when executed by the device integrator processor, further configure the diagnostic driver to capture (410) a snapshot of a health state of the serial interfaces and transmit (420) the captured snapshot to the computing device via the Ethernet interface.

In another form, the system further comprises the computing device and the computing device is configured to receive the transmitted electronic data messages from the diagnostic driver, parse and filter the messages, and store the messages for diagnosis of the abnormal condition in the communicative coupling of the device integrator processor and the serial industrial process field devices via the serial interfaces.

In another aspect, a system includes a device integrator processor (e.g., device integrator processor 118), a memory device (e.g., memory storage device 120), a diagnostic driver (e.g., diagnostic driver 302), and an Ethernet interface (e.g., Ethernet interface 204). The Ethernet interface is configured to communicatively couple the device integrator processor to Ethernet field devices (e.g., Ethernet field devices 104) for use in an industrial process of a process control system. The communicative coupling supports communication of electronic data messages with the Ethernet field devices in accordance with one or more Ethernet electronic data communication protocols. The Ethernet interface is further configured to communicatively couple the diagnostic driver to a diagnostic computing device (e.g., diagnostic computing device 310) in accordance with the one or more Ethernet electronic data communication protocols. The diagnostic driver comprises processor-executable instructions stored on the memory device. When executed by the device integrator processor, the instructions configure the diagnostic driver to capture (410) electronic data messages communicated with the Ethernet field devices via the Ethernet interface and the one or more Ethernet communication protocols without disrupting communication of the messages. The captured electronic data messages are indicative of an abnormal condition in the communicative coupling of the device integrator processor and the Ethernet field devices via the Ethernet interface.

In one form, the processor-executable instructions, when executed by the device integrator processor, further configure the diagnostic driver to transmit (420), on demand, each captured electronic data message to the computing device via the Ethernet interface.

In another form, the diagnostic driver further comprises processor-executable instructions stored on the memory device that, when executed by the device integrator processor, create (406) a circular queue (e.g., queue 408) within the memory device for initializing (404) the diagnostic driver and create (406) a dedicated task for capturing the electronic data messages.

In yet another form, the processor-executable instructions, when executed by the device integrator processor, further configure the diagnostic driver to store (416) the captured electronic data messages in the queue and transmit a captured message to the diagnostic computing device by popping the captured electronic data message from a front of the queue and including the popped electronic data message within a User Datagram Protocol packet.

In another form, the system further comprises serial interfaces (e.g., serial interfaces 206). The serial interfaces are configured to communicatively couple the device integrator processor to serial field devices (e.g., serial field devices 106) in the process control system. The communicative coupling supports communication of electronic data messages with the serial field devices in accordance with a serial electronic data communication protocol (e.g., RS232, RS422, RS485, etc.). Moreover, the processor-executable instructions, when executed by the device integrator processor, further configure the diagnostic driver to capture (410) the electronic data messages communicated with the serial field devices via the serial interfaces and the serial electronic data communication protocol without disrupting communication of the messages. Furthermore, the captured electronic data messages are indicative of an abnormal condition in the communicative coupling of the device integrator processor and the serial field devices via the serial interfaces.

In yet another form, the processor-executable instructions, when executed by the device integrator processor, further configure the diagnostic driver to capture (410) a snapshot of a health state of the Ethernet interface and transmit (420) the captured snapshot to the computing device via the Ethernet interface.

In another form, the system further comprises the computing device and the computing device is configured to receive the transmitted electronic data messages from the diagnostic driver, parse and filter the messages, and store the messages for diagnosis of the abnormal condition in the communicative coupling of the device integrator processor and the Ethernet field devices via the Ethernet interface.

In yet another aspect, a device integrator processor (e.g., device integrator processor 118) of a gateway device (e.g., gateway device 102) is coupled to serial field devices (e.g., serial field devices 106) in a process control system (e.g., process control system 100). The coupling is achieved via serial interfaces (e.g., serial interfaces 206) of the gateway device and supports communication of serial electronic data messages with the serial field devices in accordance with at least one serial electronic data communication protocol (e.g., RS232, RS422, RS485, etc.). The method further includes coupling the device integrator processor to Ethernet field devices (e.g., Ethernet field devices 104) in the process control system via Ethernet interfaces (e.g., Ethernet interfaces 204) of the gateway device. The coupling supports communication of Ethernet electronic data messages with the Ethernet field devices in accordance with an Ethernet data communication protocol. A diagnostic driver (e.g., diagnostic driver 302) of the gateway device is coupled to a workstation computing device (e.g., workstation computing device 108). The diagnostic driver comprises processor-executable instructions stored on a memory device (e.g., memory storage device 120) of the gateway device and executed by the device integrator processor. The coupling is achieved via the Ethernet interfaces and supports communication of diagnostic Ethernet electronic data packets between the diagnostic driver and the workstation computing device. The method further includes initializing (404) the diagnostic driver within the gateway device. The diagnostic driver captures (410) one or more of the serial electronic data messages communicated with the serial field devices via the serial interfaces without disrupting the communication of the serial electronic data messages. The diagnostic driver also captures (410) one or more of the Ethernet electronic data messages communicated with the Ethernet field devices via the Ethernet interfaces without disrupting communication of the Ethernet electronic data messages. The captured serial electronic data messages are indicative of an abnormal condition in the coupling of the device integrator processor to the serial field devices via the serial interfaces and the captured Ethernet electronic data messages are indicative of an abnormal condition in the coupling of the device integrator processor to the Ethernet field devices via the Ethernet interfaces. In some embodiments, the diagnostic driver or another component may capture and store a predetermined number (e.g., five) of the last packets or messages received. In the event of an abnormal condition in the system, the stored packets or messages may be analyzed to determine the cause of the abnormal condition. In some embodiments, the diagnostic driver or another component may capture and/or store packets or messages if an abnormal condition is detected. Configuration information may specify what constitutes an abnormal condition.

In one form, initializing the diagnostic driver comprises creating (406) a queue (e.g., queue 408) within the memory device and creating (406) a dedicated task for capturing the serial electronic data messages and the Ethernet electronic data messages.

In another form, the method further includes the diagnostic driver storing (416) the captured serial electronic data messages and the captured Ethernet electronic data messages in the queue.

In yet another form, the method further includes transmitting (420), on demand, the captured serial electronic data messages and the captured Ethernet electronic data messages to the workstation computing device via the Ethernet interfaces.

In another form, the transmitting includes popping (418) the serial electronic data messages and the Ethernet electronic data messages from the queue and including the popped messages within a User Datagram Protocol packet.

In yet another form, the method further includes the diagnostic driver capturing (410) snapshots of a health state of the serial interfaces and the Ethernet interfaces and transmitting (420) the captured snapshots to the workstation computing device via the Ethernet interface.

Figure 5:
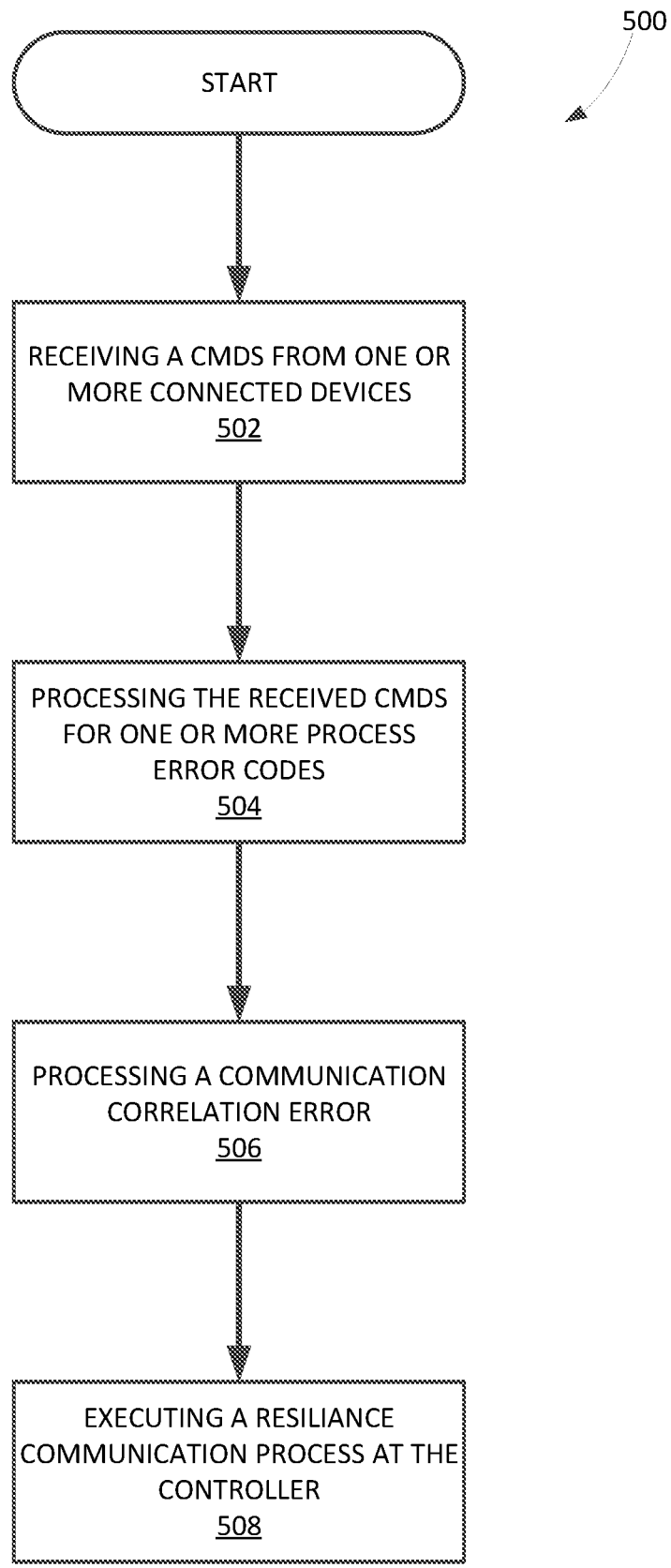
FIGS. 5 and 6 are exemplary flow diagrams illustrating methods of process control communication resilience according to one or more embodiments of the disclosure.
Figure 6:
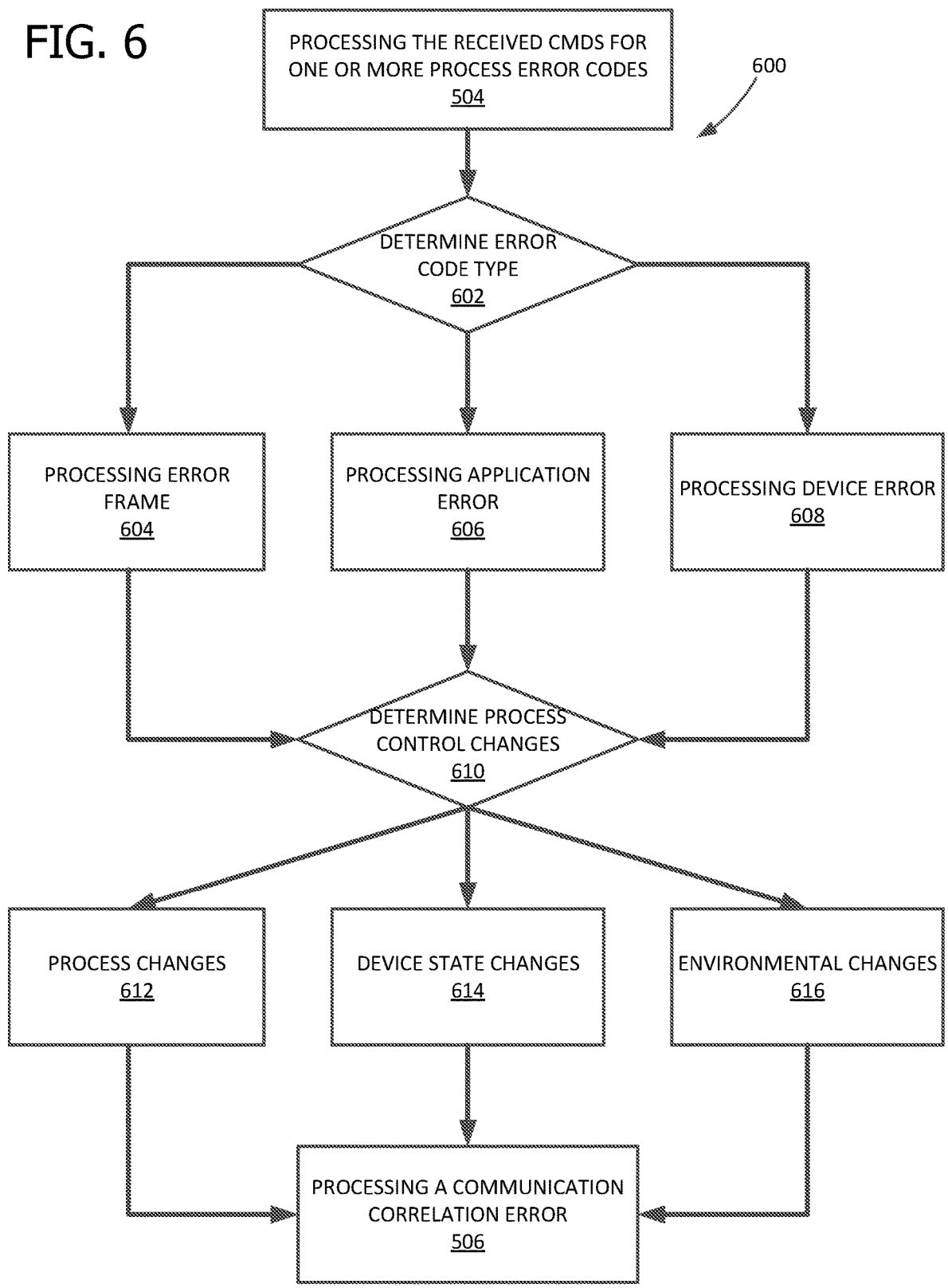

FIG. 5 is an exemplary flow diagram illustrating a method of process control communication resilience, generally indicated at 500. FIG. 6 is an exemplary flow diagram illustrating additional embodiments of a method of process control communication resilience, generally indicated at 600.

As illustrated generally at FIG. 3 a gateway device (102) may receive data from one or more field devices (e.g. 106-A) connected to the gateway device (102). It should be appreciated that each field device may exchange data with the gateway (102) via an associated highly configurable protocol. This Configurable Multi-protocol Data Stream (CMDS) may operate over a variety of protocols and media, such as, but not limited to wired, wireless, Wi-Fi, Bluetooth, 6LoPan, NFC, RS-232, RS-422, RS-485, ethernet, Modbus, and/or other media and/or protocols appropriate for devices used in such applications described herein.

Referring further to FIG. 5, a gateway device (102), or more generally a controller, receives a CMDS from one or more of the devices connected devices (502). It should be appreciated each connected device may have a unique associated data stream that may contain a variety of information including device data, process data, sensor data, environmental data, historic data, and/or error data.

A gateway device (102) processes the received CMDS for one or more process error event codes (504). Referring further to FIG. 6, it should be appreciated that a variety of error codes may be identified (602) and may be utilized for further processing. Such error codes may include an error frame (604), application error (606), and or device error (608). Other errors may exist that may be obtained from the one or more devices, external data storage, such as a historical data repository, and/or the gateway device (102) itself may be a source of additional errors.

It is also at this time that other process control changes may be determined (610). As with the variety of error codes, process control changes may be monitored and changes noted to assist in any correlation of communication errors to process and/or environmental changes. Process changes (612) may include, but are not limited to, planned alterations to a process to obtain a different result. An example may be to increase the temperature of a mixture to cause a faster cure time. In such an example, devices utilized and timing of the new process may cause unique and/or unexpected results. Device state changes (614), expected or not due to an error condition, may also result in unique and/or unexpected process results. Environmental changes (616) may also occur in processes that take place in part or completely in an uncontrolled environment. As one of many examples, if an exhaust stack emits water vapor when the ambient temperature is at 70 degrees Fahrenheit, should the ambient temperature change to 20 degrees Fahrenheit, a variety of process changes may result.

Results of these changes are processed and a communication correlation error based on the one or more process event error codes (506) and/or other information illustrated generally in FIG. 6 is created. Such an error correlates communication errors with process changes of the variety of types described above and errors received from the connected devices themselves, again of the variety of types described above. This correlation identifies one or more process changes, device changes, and/or environmental changes that if executed will reduce and/or eliminate the communication issues being experienced during the process under observation.

Once the communication correlation error is processed (506), a communication resilience process is executed at the controller utilizing the one or more connected devices based on the communication correlation error (508). During this execution, the gateway device (102) with the provided communication resilience process will execute the necessary processes at the associated devices to effect the necessary changes to the system, process, devices, and/or environments to effect the overall change. A feedback loop is utilized as the connected devices continue to transmit CMDS to the gateway device (102) and continuous analysis is perfumed to identify any communication issues and ameliorate and/or eliminate same on an ongoing basis.

As one of many possible examples, in the example of an oil rig drilling for crude oil at particular depths may require additional pumps to transport the crude to a holding tank. Utilizing the detailed method, a communication error may occur when oil is pumped from beyond 1000 feet below the sea floor. Such a communication error may inhibit an accurate reading of a pressure sensor which is responsible for measuring head pressure on a pump. In the example, these errant readings may cause the pump to shut down as the system determines the possibility for an over-pressure situation and line rupture. In this example, a situation exists where the engagement of the additional pump, rather than the pressure of the line, causes the communication fault to disable the process.

In this case, the gateway device (102) receives CMDS data from all the associated sensors and makes the correlation that the engagement of the additional pump utilized beyond 1000 feet is correlated with the communication error of the pressure sensor which shuts the operation down. As a result of the analysis described in the method, a communication resilience process is executed where the pressure sensor is not engaged to read until after a determined start up time of the offending pump. In this way, the pump can start, emit the typical EMI due to a current inrush on a motor, and electrically settle out before the pressure sensor is engaged. In that way, once the sensor is engaged any EMI coupling to the communication lines of the pressure sensor are reduced or eliminated to the point of not causing a communication issue any longer. As needed, the cycle repeats with the variety of connected devices and associated processes.

Existing systems require disconnecting a device interface and connecting a special hardware snooper to detect and/or diagnose abnormal conditions. Debugging problems with Ethernet ports requires configuring a mirror port on a network switch that interfaces with a gateway. Debugging problems with an Ethernet port requires connecting a station to the mirrored port to run a packet-capture tool. The foregoing requires disrupting communications with and among devices and/or adding additional hardware in a communication path, thereby increasing system cost and complexity. Accordingly, the foregoing are technical problems. An exemplary embodiment of the system for disruptionless message capturing within an industrial control system may comprise a diagnostic driver that captures electronic data messages indicating an abnormal condition and communicated among or with serial devices via serial interfaces without disrupting the communication and transmitting the captured messages to a computing device. At least this foregoing combination of features comprises a system architecture that serves as a technical solution to the foregoing technical problem. This technical solution is not routine, is unconventional, and is not well-understood in the field of networked computerized industrial control automation systems. This technical solution is a practical application of the exemplary system at least because it solves the foregoing technical problem and constitutes an improvement in the technical field of networked computerized industrial control automation systems at least by allowing a user to perform debugging without disconnecting a device interface and connecting a special hardware snooper to detect and/or diagnose abnormal conditions; debug problems with Ethernet ports without configuring a mirror port on a network switch that interfaces with a gateway; debugging problems with an Ethernet port without connecting a station to the port to run a packet-capture tool; perform debugging without disrupting communications with and/or among devices; and perform debugging without adding additional hardware in a communication path (i.e., avoiding added cost and system complexity).

In some embodiments, the technical solution may comprise, instead or in addition, using an Ethernet interface configured to communicatively couple the diagnostic driver to a diagnostic computing device with an Ethernet communication protocol, wherein the diagnostic driver captures messages in accordance with a serial communication protocol. At least this foregoing combination of features comprises a system architecture that serves as a technical solution to the foregoing technical problem. This technical solution is not routine, is unconventional, and is not well-understood in the field of networked computerized industrial control automation systems. This technical solution is a practical application of the exemplary system at least because it solves the foregoing technical problem and constitutes an improvement in the technical field of networked computerized industrial control automation systems at least by allowing a user performing debugging not disconnecting a device interface and connecting a special hardware snooper to detect and/or diagnose abnormal conditions; debug problems with Ethernet ports without configuring a mirror port on a network switch that interfaces with a gateway; debugging problems with an Ethernet port without connecting a station to the port to run a packet-capture tool; perform debugging without disrupting communications with and/or among devices; and perform debugging without adding additional hardware in a communication path (i.e., avoiding added cost and system complexity).

It should be appreciated this is one of a wide variety of possibilities based on the various elements associated with a process and associated system.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Embodiments of the disclosure may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements. Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for disruptionless message capturing within an industrial control system comprising:
   a device integrator processor configured for communicating electronic data messages in a process control system;
   a memory device coupled to the device integrator processor;
   a diagnostic driver;
   a plurality of serial interfaces configured to communicatively couple the device integrator processor to a set of two or more serial field devices, the serial field devices for use in an industrial process of the process control system, the device integrator processor communicating the electronic data messages with the serial field devices via the serial interfaces in accordance with at least one serial electronic data communication protocol; and
   an Ethernet interface configured to communicatively couple the diagnostic driver to a diagnostic computing device in accordance with an Ethernet electronic data communication protocol;
   wherein the diagnostic driver comprises processor-executable instructions stored on the memory device, and wherein the instructions, when executed by the device integrator processor, configure the diagnostic driver to:
      detect an abnormal condition in the communicative coupling of the device integrator processor and the serial field devices via the serial interfaces,
      in response to the detected abnormal condition, capture one or more of the electronic data messages communicated with the serial field devices via the serial interfaces in accordance with the serial communication protocol without disrupting said communication thereof, the captured electronic data messages being stored in the memory device, and
      transmit the captured electronic data messages to the diagnostic computing device via the Ethernet interface for diagnosis thereof relating to the abnormal condition, and
   wherein the captured electronic data messages are indicative of the abnormal condition in the communicative coupling of the device integrator processor and the serial field devices via the serial interfaces.

2. The system of claim 1, wherein the transmission of the captured electronic data messages is on demand.

3. The system of claim 1, wherein the diagnostic driver further comprises processor-executable instructions stored on the memory device that, when executed by the device integrator processor, create a circular queue within the memory device for initializing the diagnostic driver and create a dedicated task for capturing the electronic data messages.

4. The system of claim 3, wherein the diagnostic driver further comprises processor-executable instructions stored on the memory device that, when executed by the device integrator processor, further configure the diagnostic driver to:
   store the captured electronic data messages in the queue; and
   transmit a captured message to the computing device by popping the captured electronic data message from a front of the queue and including the popped electronic data message within a User Datagram Protocol packet.

5. The system of claim 1,
   wherein the Ethernet interface is further configured to communicatively couple the device integrator processor to one or more Ethernet field devices for use in an industrial process of the process control system for supporting communication of electronic data messages with the Ethernet field devices in accordance with the Ethernet electronic data communication protocol,
   wherein the processor-executable instructions, when executed by the device integrator processor, further configure the diagnostic driver to capture one or more of the electronic data messages communicated with the Ethernet field devices via the Ethernet interface in accordance with the Ethernet electronic data communication protocol without disrupting said communication thereof, and
   wherein the captured electronic data messages are indicative of an abnormal condition in the communicative coupling of the device integrator processor and the Ethernet field devices via the Ethernet interface.

6. The system of claim 1, wherein the processor-executable instructions, when executed by the device integrator processor, further configure the diagnostic driver to:
  capture a snapshot of a health state of the serial interfaces, and
  transmit the captured snapshot to the computing device via the Ethernet interface.

7. The system of claim 1, further comprising the computing device, wherein the computing device is configured to:
  receive the transmitted electronic data messages from the diagnostic driver;
  parse the received messages;
  filter the parsed messages; and
  store the filtered messages for diagnosis of the abnormal condition in the communicative coupling of the device integrator processor and the serial field devices via the serial interfaces.

8. A system for disruptionless message capturing within an industrial control system comprising:
  a device integrator processor configured for communicating electronic data messages in a process control system;
  a memory device coupled to the device integrator processor;
  a diagnostic driver; and
  an Ethernet interface configured to:
    communicatively couple the device integrator processor to two or more Ethernet field devices, the Ethernet field devices for use in an industrial process of the process control system, the device integrator processor communicating the electronic data messages with the Ethernet field devices via the Ethernet interface in accordance with one or more Ethernet electronic data communication protocols, and
    communicatively couple the diagnostic driver to a diagnostic computing device in accordance with at least one of the one or more Ethernet electronic data communication protocols;
  wherein the diagnostic driver comprises processor-executable instructions stored on the memory device, and wherein the instructions, when executed by the device integrator processor, configure the diagnostic driver to:
    detect an abnormal condition in the communicative coupling of the device integrator processor and the Ethernet field devices via the Ethernet interface, and
    in response to the detected abnormal condition, capture one or more of the electronic data messages communicated with the Ethernet field devices via the Ethernet interface in accordance with the one or more Ethernet electronic data communication protocols without disrupting said communication thereof, the captured electronic data messages being stored in the memory device, and
  wherein the captured electronic data messages are indicative of the abnormal condition in the communicative coupling of the device integrator processor and the Ethernet field devices via the Ethernet interface.

9. The system of claim 8, wherein the processor-executable instructions, when executed by the device integrator processor, further configure the diagnostic driver to transmit, on demand, each captured electronic data message to the diagnostic computing device via the Ethernet interface.

10. The system of claim 8, wherein the diagnostic driver further comprises processor-executable instructions stored on the memory device that, when executed by the device integrator processor, create a circular queue within the memory device for initializing the diagnostic driver and create a dedicated task for capturing the electronic data messages.

11. The system of claim 10, wherein the diagnostic driver further comprises processor-executable instructions stored on the memory device that, when executed by the device integrator processor, further configure the diagnostic driver to:
  store the captured electronic data messages in the queue; and
  transmit a captured electronic data message to the diagnostic computing device by popping the captured electronic data message from a front of the queue and including the popped electronic data message within a User Datagram Protocol packet.

12. The system of claim 8, further comprising one or more serial interfaces configured to communicatively couple the device integrator processor to two or more serial field devices for use in an industrial process of the process control system for supporting communication of electronic data messages with the serial field devices in accordance with at least one serial electronic data communication protocol,
  wherein the processor-executable instructions, when executed by the device integrator processor, further configure the diagnostic driver to capture one or more of the electronic data messages communicated with the serial field devices via the one or more serial interfaces and the serial electronic data communication protocol without disrupting said communication thereof, and
  wherein the captured electronic data messages are indicative of an abnormal condition in the communicative coupling of the device integrator processor and the serial field devices via the one or more serial interfaces.

13. The system of claim 8, wherein the processor-executable instructions, when executed by the device integrator processor, further configure the diagnostic driver to:
  capture a snapshot of a health state of the Ethernet interface, and
  transmit the captured snapshot to the diagnostic computing device via the Ethernet interface.

14. The system of claim 8, further comprising the diagnostic computing device, wherein the diagnostic computing device is configured to:
  receive the transmitted electronic data messages from the diagnostic driver;
  parse the received messages;
  filter the parsed messages; and
  store the filtered messages for diagnosis of the abnormal condition in the communicative coupling of the device integrator processor and the Ethernet field devices via the Ethernet interface.

15. A tangible non-transitory computer-readable medium storing processor-executable instructions that, when executed, configure a device integrator processor of a gateway device for disruptionless message capturing within an industrial control system, the instructions comprising:
  coupling the device integrator processor of the gateway device to two or more serial field devices in a process control system via one or more serial interfaces of the gateway device, said coupling to the serial field devices supporting communication of serial electronic data messages with the serial field devices in accordance with at least one serial electronic data communication protocol;
  coupling the device integrator processor to two or more Ethernet field devices in the process control system via one or more Ethernet interfaces of the gateway device, said coupling to the Ethernet field devices supporting communication of Ethernet electronic data messages with the Ethernet field devices in accordance with an Ethernet data communication protocol;

coupling a diagnostic driver of the gateway device to a workstation computing device via the one or more Ethernet interfaces, said coupling to the workstation computing device supporting communication of diagnostic Ethernet electronic data packets between the diagnostic driver and the workstation computing device;

initializing the diagnostic driver within the gateway device and causing the diagnostic driver to capture one or more of the serial electronic data messages communicated with the serial field devices via the one or more serial interfaces without disrupting the communication of the serial electronic data messages and to capture one or more of the Ethernet electronic data messages communicated with the Ethernet field devices via the one or more Ethernet interfaces without disrupting the communication of the Ethernet electronic data messages, wherein at least one of:

the captured serial electronic data messages are indicative of an abnormal condition in the coupling of the device integrator processor to the serial field devices via the one or more serial interfaces, and the captured Ethernet electronic data messages are indicative of an abnormal condition in the coupling of the device integrator processor to the Ethernet field devices via the one or more Ethernet interfaces.

16. The tangible non-transitory computer-readable medium of claim 15, wherein said initializing comprises:

creating a queue within the memory device, and creating a dedicated task for capturing the serial electronic data messages and the Ethernet electronic data messages.

17. The tangible non-transitory computer-readable medium of claim 16, further comprising instructions for storing, by the diagnostic driver, the captured serial electronic data messages and the captured Ethernet electronic data messages in the queue.

18. The tangible non-transitory computer-readable medium of claim 17, further comprising instructions for transmitting, on demand, the captured serial electronic data messages and the captured Ethernet electronic data messages to the workstation computing device via the one or more Ethernet interfaces.

19. The tangible non-transitory computer-readable medium of claim 18, wherein said transmitting comprises popping the serial electronic data messages and the Ethernet electronic data messages from the queue and including the popped serial electronic data messages and Ethernet electronic data messages within a User Datagram Protocol packet.

20. The tangible non-transitory computer-readable medium of claim 15, further comprising instructions for:

capturing, by the diagnostic driver, one or more snapshots of a health state of the one or more serial interfaces and the one or more Ethernet interfaces; and transmitting the captured snapshots to the workstation computing device via the one or more Ethernet interfaces.

* * * * *